Patented June 15, 1943

2,321,978

UNITED STATES PATENT OFFICE 2,321,978

TERPENE DERIVATIVE

Joseph N. Borglin, Wilmington, Del., assignor to Hercules Powder Company, Wilmington, Del., a corporation of Delaware No Drawing. Application April 9, 1941,
Serial No. 387,675

13 Claims. (Cl. 260—611)

This invention relates to new terpene compounds and a method for their formation. More particularly, it refers to new hydroxyl-containing terpene ethers and to a method for their preparation.

In accordance with this invention an unsaturated terpene is brought into intimate contact with oxygen and with an alcohol and is reacted therewith until a hydroxyl-containing terpene ether is formed. This reaction may be conducted under pressure if desired, and it may be facilitated by the aid of catalysts if desired. By the reaction in accordance with this invention, there is formed a mixture of hydroxyl-containing terpene ethers which at moderate temperatures of operation will be a mixture of water-soluble hydroxyl-containing terpene ethers and oily water-insoluble hydroxyl-containing terpene ethers. These products are characterized by ether linkages and by hydroxyl groups upon secondary and tertiary carbon atoms of the terpenic portion of the molecule. The two types of product mentioned may be separated and recovered from the reaction mixture.

The terpene utilized in the method according to this invention will be an unsaturated terpene which may be of a substituted or unsubstituted nature. Thus, the term "terpene" as used herein and in the claims is used in its broader sense, and includes both terpene hydrocarbons and derivatives thereof which may be considered as terpene hydrocarbons which have been modified by substitution or addition thereto of elements or groups containing elements such as oxygen, sulphur, nitrogen, halogens and so forth. Suitable unsaturated terpenes which may be utilized are such unsaturated terpene hydrocarbons as, for example, alpha-pinene, beta-pinene, dipentene, terpinene, terpinolene, allo-ocimene, alpha- and beta-pyronenes, myrcene, phellandrene, the various unsaturated sesquiterpenes, polyterpenes, and the like; such unsaturated terpene alcohols as alpha-terpineol, beta-terpineol, terpinenol, and the like; such unsaturated terpene esters as alpha-terpinyl acetate, alpha-terpinyl formate, beta-terpinyl acetate, beta-terpinyl formate, terpinenol propionate, and the like; such unsaturated terpene ethers as terpinyl methyl ether, terpinyl ethyl ether, terpinyl glycol ether, and the like; terpinyl mercaptan; terpinyl amine; terpinyl chloride; and so forth.

The alcohol which is utilized in the method according to this invention may be aliphatic (i. e., alkyl or cycloalkyl, including substituted and ethylenic alkyl and cycloalkyl alcohols), heterocyclic, or aromatic (i. e., aryl, aralkyl, alkaryl, including substituted alcohols of these types). Compounds containing a phenolic hydroxyl are considered as alcohols in the reaction according to this invention. Suitable alcohols are, for example, methanol, ethanol, propanol, isopropanol, butanol, isobutanol, amyl alcohol, beta-chloroethanol, beta-ethylethanol, beta-methyl-ethanol, allyl alcohol, cyclohexanol, furfuryl alcohol, tetrahydrofurfuryl alcohol, ethylene glycol, glycerol, erythritol, sorbitol, benzyl alcohol, phenol, orthocresol, metacresol, paracresol, xylenol, triethanolamine, diethanolamine, monoethanolamine, trimethylolnitromethane, nitropropanol, aminopropanol, and the like.

The oxygen utilized in the reaction according to this invention may be provided in the form of any gas containing free oyxgen. Pure oxygen may be utilized, if desired. However, oxygen is most conveniently provided in the ordinary atmospheric form.

The reaction in accordance with this invention is brought about by mixing the terpene and the alcohol utilized and bringing this mixture into intimate contact with oxygen. This may be accomplished by vigorous agitation of the liquid reactants to provide a constant renewal of surface exposed to the oxygen. Preferably, air or oxygen is whipped up into the liquid or is bubbled through the liquid reactants. The reaction is facilitated by providing the oxygen under superatmospheric pressure. Thus, air at any convenient pressure may supply the oxygen, the speed of the reaction increasing as the pressure is increased. Pressures up to several thousand atmospheres may be utilized, the actual pressure being dictated largely by convenience.

The reaction may be conducted at any temperature in the range between about 0° C. and about 200° C., or between 0° C. and 100° C. where water-soluble products are desired. Preferably the temperature will be maintained between about 15° C. and about 60° C. as only in this range are good yields of water-soluble products obtained in a reasonable time. Where oxygen is provided under conditions promoting rapid reaction, as by the use of oxygen under pressure with or without agitation, or when the oxygen is bubbled through the liquid reactant, the temperature of the reaction mixture may rise rapidly, since the reaction is exothermic. It is frequently desirable to provide external cooling in such cases.

The time required to form hydroxyl-containing terpene ethers by the method in accordance with this invention varies considerably with the conditions of reaction and with the reactants utilized. Thus terpinolene reacts much more readily than other terpenes. The conditions of oxygen contact largely determine the minimum time of reaction for a particular set of reactants. Where the liquid reactants are merely agitated in air, or where air is slowly bubbled through a large mass of liquid reactants, the reaction time will usually be very long, and may be from half a day to, say, 20 days. The time will be reduced as agitation is increased, and in the case of reactants under high oxygen pressures, the reaction time may be as short as from, say, about 1 to about 8 hours. Continuous operation is practicable under conditions giving short reaction time; batch operation is preferred for the longer reactions.

Usually, the liquid reaction mixture will consist essentially of the terpene and the alcohol (which may be aqueous) reacted, with the alcohol in excess of that expected to enter into the reaction. However, inert diluents such as benzene, toluene, acetone, methylethyl ketone, ethyl acetate, petroleum ether, and the like, may be added.

The oxidation-etherification reaction in accordance with this invention is conducted either in the substantial absence or in the presence of water. When water is present, the proportion of water-soluble product and the hydroxyl content of the total product tend to be increased. Water may be present in a quantity of, say, three times the quantity of the alcohol utilized on a molecular basis or more may be used. However, large quantities of water reduce the content of ether linkages obtained in the product and tend to slow down the reaction due to decreased miscibility with the terpene. Hence, where water is utilized, the quantity will preferably be in the range between a minor quantity such as 5% of the alcohol up to about one-half the quantity of the alcohol, by molecular proportion.

The reaction may be facilitated if desired by the use of catalysts. Oxygen carrier or oxidation catalysts which operate by reason of active surfaces such as activated carbon, flake aluminum, and the like; or which contain elements which readily undergo reversible changes in valence such as, for example, potassium permanganate, selenium oxide, cerium sulphate, vanadium sulphate, cobalt naphthanate, manganese linoleate, lead naphthanate, lead linoleate, and the like; or hydrohalides of basic nitrogen compounds (ammonia and amines), for example, ammonium chloride, ammonium bromide, aniline hydrochloride, pyridine hydrochloride, triethanolamine hydrochloride, methylamine hydrochloride, and the like are effective. Such catalysts may be utilized under any of the conditions of reaction previously mentioned.

The reaction in accordance with this invention will usually be conducted until substantially no more oxygen is absorbed by the reaction mixture. The reaction product will be a mixture containing hydroxy terpene ethers of an oily nature insoluble in water and hydroxy terpene ethers of a water-soluble nature. These products may be recovered as a mixture by filtering off any solid materials such as solid catalysts and evaporating off volatile materials such as unreacted terpenes, water and alcohol wholly or in part under vacuum. The products may be separated by separating the two layers which form when water is present or which are formed by the addition of water, if little or none is present. The water-soluble products may be concentrated as a viscous syrupy liquid by careful evaporation of the water and alcohol from the water layer under vacuum at the lowest possible temperatures. The water-insoluble products may be concentrated from the oily layer in a similar manner by evaporation under vacuum of the unreacted terpenic and other associated volatile materials. The most highly hydroxylated material is the least volatile.

The syrupy water-soluble product obtained from the water fraction may be further resolved, in most cases, into white crystalline and non-crystalline products by allowing the fraction to stand cool for some weeks. Products obtained from the terpene hydrocarbons and the more reactive alcohols such as methyl, ethyl, isopropyl alcohol, phenol, etc., furnish highest yield of the crystalline water-soluble product.

The water-soluble products and the water-insoluble products obtained by the method in accordance with this invention are terpene ethers of the alcohol utilized having a hydroxyl upon the terpenic portion of the molecules. It is a characteristic of the compounds that they contain a hydroxyl upon a tertiary carbon atom of the terpenic structure, and in addition they will usually contain a hydroxyl upon a secondary carbon atom of the terpenic structure. The water-soluble product in general has a higher hydroxyl content than the water-insoluble product. Both products are believed to consist of a mixture of rather similar compounds which differ from each other in part by degree of oxidation and in part by isomerization. It is believed that the addition of hydroxyl groups and ether groups such as the alkoxyl, aryloxyl, etc., groups is not entirely uniform, so that several isomers may be obtained from the same terpenes.

The products in accordance with this invention are subject to modification by heating in the presence of an acid, especially a strong, inorganic acid, such as sulphuric acid, sodium acid sulphate, phosphoric acid, nitric acid, hydrochloric acid, etc.; or in the presence of dehydrating surface active agents such as activated silica gel, activated alumina, and the like, to form products of reduced hydroxyl content by chemical dehydration. Thus, the water-soluble hydric ethers may be partially or wholly dehydrated to form water-insoluble ethers.

The exact mechanism of the reaction according to this invention is not known. Analysis shows the presence of ether linkages and of tertiary alcohol linkages on the terpenic portion of the product, and usually hydroxyls on secondary carbons are found. The reactions involve increase in the molecular weight of the terpene, and are, therefore, of the nature of addition reactions. No appreciable scission of the terpene or cracking takes place, although isomerization and/or decyclicization of the terpenic structure may occur. It is believed the following equations express the nature of the reactions which occur, for example, when a terpene hydrocarbon is reacted with oxygen and an alcohol to form a mixture of ethers. Ethyl alcohol serves as an example typical of the alcohols:

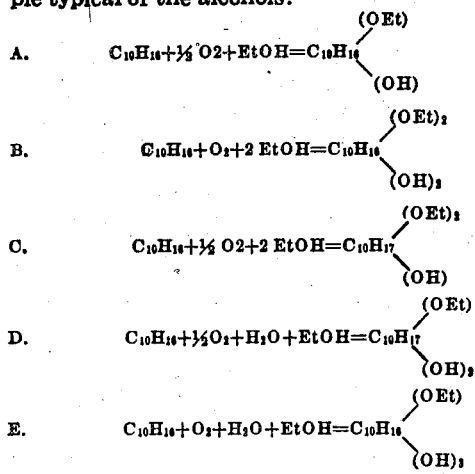

It will be appreciated that the equations represent hypotheses but it is believed a mixture of products of the formulas indicated is produced as indicated.

The process and product in accordance with this invention are illustrated by specific embodiments thereof in the following examples.

*Example 1*

A mixture of 1500 cc. of methanol and 1500 cc. of a terpineolene cut (boiling range, 186° C. to 194° C.) was stirred for 252 hours while a slow stream of air was passed through the mixture. An exothermic reaction took place, causing the temperature of the mixture to rise from an initial 28° C. to 35° C. At the end of the reaction period, 700 cc. of water were added, and the resulting mixture was well shaken. The diluted reaction mixture was permitted to separate into two layers, which were separated by decantation. In this manner, 2260 cc. of an aqueous phase and 1425 cc. of an oily phase were obtained. Water was removed from the aqueous layer by evaporation under a high vacuum. In this manner, 59 grams of a pale yellow liquid terpene hydroxy ether soluble in water was obtained.

*Example 2*

A mixture of 1000 cc. of a terpineolene cut (boiling range, 180° C. to 190° C.) and 2000 cc. of 95% ethyl alcohol was mechanically stirred for 341 hours while a slow stream of air was passed through the mixture. An exothermic reaction took place, raising the temperature of the mixture from an initial 28° C. to 35° C. The resulting reaction mixture was placed in a separatory funnel, and permitted to separate into two layers. In this manner, an oily layer having a volume of 780 cc. and an alcohol solution having a volume of 2005 cc. were obtained. The alcohol solution was evaporated under high vacuum and at a relatively low temperature. In this manner, 396 grams of water-soluble terpene hydroxy-containing ethers were recovered. The material was a light-colored, viscous liquid which analyzed as follows:

Saponification number_____ 55.0
Secondary alcohol content____per cent__ 25.0
Tertiary alcohol content_____do____ 127.0
Ethoxyl (—OC₂H₅)_____do____ 11.75

The alcohol contents were obtained by calculating hydroxyl content on the basis of a C₁₀H₁₇OH monohydric terpene alcohol. Thus, the figures show that a tertiary hydroxyl content averaging more than one hydroxyl per molecule is attained in addition to the secondary hydroxyls. The analysis shows that the product consists of a mixture of hydroxy terpene ethers wherein the hydroxyl groups are secondary and tertiary in nature. A portion of the water-soluble liquid product was permitted to stand for a month. A white crystalline product was recovered by centrifuging from the syrupy liquid.

The oily layer recovered in the foregoing oxidation-etherification reaction was fractionated in vacuo (10 cm. pressure) into two fractions of distillate coming over between 50° C. and 100° C. and a distillation residue. These fractions gave the following analyses:

| | Fraction No. 1 | Fraction No. 2 | Distillation residue |
|---|---|---|---|
| Saponification number | 2.0 | 5.0 | 48 |
| Secondary alcohol content | 3.5% | 6.1% | 20% |
| Tertiary alcohol content | 8.1% | 9.1% | 52.5% |
| Volume | 100 cc. | 175 cc. | 239.6 g. |

It will be noted that the two fractions of distillate represent products reacted to a considerably less extent, and, therefore, of lower molecular weight than the residue which was not distilled over.

*Example 3*

A slow stream of air was passed through an agitated mixture consisting of 500 cc. of alloocimene and 1000 cc. of 95% ethyl alcohol for a period of 90 hours. To the resulting reaction product was added 150 cc. of water and the mixture was shaken well and then allowed to separate into two layers. The layers were separated from each other by decantation.

The dilute aqueous layer obtained was evaporated in vacuo and at a low temperature (50–60° C.) to remove water and alcohol, and in this manner there were obtained 126 grams of water-soluble terpene hydroxy-containing ether. This product had an ethoxyl content of 13.8%. It became turbid due to partial crystallization upon standing some weeks.

The oily layer which consisted of 400 cc. was distilled in vacuo to yield a distillate and a distillation residue having the following analyses:

| | Distillate | Distillation residue |
|---|---|---|
| Volume | 150 cc. | 130 cc. |
| Ethoxyl content | 1.78% | 5.17% |
| Tertiary alcohol content | 14.8% | 55.0% |
| Secondary alcohol content | 9.4% | 14.2% |

*Example 4*

A slow stream of air was bubbled through an agitated reaction mixture consisting of 2000 cc. of terpinolene (boiling range, 182° C. to 194° C.), 950 cc. of water and 150 cc. of triethanolamine for a period of 329 hours with the reaction mixture at a temperature of 30–35° C. At the end of the reaction period, agitation was discontinued, and the reaction mixture was permitted to separate into two layers. The aqueous layer (1100 cc.) was evaporated in vacuo and at low temperature to give 934 grams of water-soluble terpene hydric amino ethers having the following analyses:

Nitrogen (combined)_____per cent__ 1.13
Hydroxyl content _____do____ 7.8
Free triethanolamine_____ 0

The oily layer consisted of unreacted terpenes and triethanolamine ethers of low hydroxyl content.

Example 5

A slow stream of air was bubbled through an agitated mixture consisting of 2000 cc. of terpinolene (boiling range, 182° C. to 191° C.) and 200 grams of phenol for a period of 329 hours at a temperature of 28 to 35° C. At the end of the reaction period, 1000 cc. of water were added and the mixture was shaken well. Two layers were then permitted to form, 1100 cc. of an aqueous layer being obtained. Upon evaporation to remove water from the aqueous layer at low temperature and in vacuo, 710 grams of water-soluble terpene hydric phenyl ether were obtained. This product was free from phenol. Partial crystallization of the product was brought about upon three weeks standing at 20° C. The crystals were white.

The oily layer (1960 cc.) was steam distilled to obtain 710 grams of distillate and 1127 grams of distillation residue. The steam distillation residue analyzed as follows:

Average molecular weight (Rast method) _ 196
Specific gravity $\frac{15.6°C}{15.6°C}$ ------------------ 1.0741
$n^{20}{}_D$ ----------------------------------- 1.5275
Hydroxyl content (Zerewitinoff method)
-----------------------------per cent__ 12.1
A. S. T. M. boiling range (760 mm.):

| Per cent distilled | Temperature |
|---|---|
| | °C. |
| 5% | 164.5 |
| 10 | 167.8 |
| 20 | 174.5 |
| 30 | 186.0 |
| 40 | 194.5 |
| 50 | 208.9 |
| 60 | 224.5 |
| 70 | 249.5 |
| 80 | 315.5 |
| 90 | 326.5 |
| 95 | 331.5 |

This product consisted of several phenyl ethers of low hydroxyl content and some unreacted terpene.

Example 6

A slow stream of air was bubbled through an agitated mixture consisting of 1500 cc. of terpinolene (boiling range, 186° C. to 189° C.) and 1500 cc. of methanol for a period of 252 hours. At the end of this period, 1650 cc. of water were added and the mixture was shaken well. Two layers were then permitted to form, and these were separated by decantation. The aqueous layer which consisted of 3500 cc. was evaporated at low temperature and in vacuo to remove water. In this manner, 562 grams of terpene hydric methyl ether were obtained. The product analyzed as follows:

Hydroxyl (Zerewitinoff method) __per cent__ 13.5
Methoxyl content _____do____ 17.8

White crystals formed in this product upon standing for a month.

The oily layer which consisted of 1013 cc. was steam distilled under reduced pressure, whereby 525 cc. of distillate and 412 grams of a distillation residue were obtained. These products analyzed as follows:

| | Distillate | Residue |
|---|---|---|
| Quantity | 525 cc. | 412 grams |
| Methoxyl content | 1.5% | 12.5% |
| $n^{20}{}_D$ | 1.4793 | 1.4935 |
| Hydroxyl (Zerewitinoff) | 1.25% | 8.75% |

Example 7

A slow stream of air was bubbled through an agitated mixture consisting of 1500 cc. of terpinolene and 1500 of 95% ethyl alcohol for a period of 252 hours. The reaction mass was then diluted with water, and two resulting layers separated by decantation. The aqueous alcohol layer was subjected to evaporation, and in this manner gave 437 grams of water-soluble terpene hydric ethyl ether which had an ethoxyl content of 8.18%.

The oily layer was steam distilled to give a distillate of 575 cc. and a distillation residue of 470 grams, the latter material having an ethoxyl content of 10.2%.

Example 8

A mixture consisting of 500 cc. of terpinolene, 500 cc. of methanol, and 2.5 grams of activated carbon (Darco) was placed in an autoclave, and the autoclave charged with air at a gauge pressure of 1500 pounds per square inch. The autoclave was then vigorously shaken and maintained at a temperature of 35° C. for 5½ hours. The resulting product was removed from the autoclave, and filtered to remove the activated carbon. The filtrate was then diluted with water and the two layers which formed were separated by decantation. Evaporation of the aqueous alcohol layer in vacuo at low temperature gave 122 grams of water-soluble terpene hydric ether. This product partially crystallized upon standing for three weeks at 20° C.

Example 9

A mixture consisting of 500 cc. of terpinolene and 500 cc. of methanol was charged into an autoclave, and the autoclave charged with air at a gauge pressure of 1200 pounds per square inch. The autoclave was vigorously shaken for six hours and maintained at a temperature of 50° C. during this period. The resulting product was then removed from the autoclave, diluted with water, and the two layers which formed were separated by decantation. The aqueous alcohol layer was evaporated in vacuo and at low temperature to obtain the water-soluble terpene hydric ether.

Example 10

A mixture consisting of 500 cc. of terpinolene, 500 cc. of methanol, and 2.5 grams of flake aluminum was charged into an autoclave with air at a gauge pressure of 1000 pounds per square inch. The autoclave was then vigorously shaken for 5½ hours at a temperature of 54–70° C. The resulting reaction product was removed from the autoclave and diluted with water. The two liquid layers which formed were separated by decantation. The aqueous alcohol layer was subjected to evaporation in vacuo at a low temperature to yield 132 grams of water-soluble terpene hydric methyl ether as a syrupy liquid. Partial crystallization of this product after three weeks standing at 20° C. gave a white crystalline hydric methyl ether.

Example 11

A mixture consisting of 500 cc. of methanol, 500 cc. of terpinolene and 2.5 grams of ammonium chloride was charged into an autoclave with air at a gauge pressure of 1000 pounds per square inch. The autoclave was vigorously shaken for 5½ hours at a temperature of 50–65° C. The resulting product was removed from the autoclave, diluted with water, and the two layers which formed were separated by decantation. The aqueous alcohol layer was subjected to evaporation in vacuo at a relatively low temperature, whereby 146 grams of water-soluble terpene hydric ether were obtained.

Example 12

A mixture consisting of 500 cc. of pyronenes (mixture of alpha- and beta-pyronenes), 500 cc. ethanol (90%), and 2 grams of activated carbon was charged into an autoclave, subjected to 1000 lbs./sq. inch air pressure and agitated for a period of 8 hours at a temperature held between 30° C. and 48° C. The reaction product was filtered free of carbon, diluted with 500 cc. of water and the water layer evaporated under reduced pressure and low temperature, whereby 123 grams of water-soluble terpene hydric ether was obtained.

Example 13

A mixture consisting of 500 cc. of dipentene and 500 cc. of methanol was agitated for a period of 325 hours during which time a slow stream of air was passed through. The reaction temperature was 28 to 40° C. To the reaction mass was added 400 g. water with agitation. The resulting aqueous layer was decanted and evaporated under reduced pressure, whereby 73 grams of terpene hydric ether was obtained. Partial crystallization took place upon standing three weeks, a white crystalline hydric methyl ether being obtained.

Example 14

A mixture consisting of 500 cc. of myrcene, 500 cc. of methanol and 50 cc. of water was agitated for a period of 15 hours in an autoclave under an air pressure of 1500 lbs./sq. inch, the autoclave being held at a temperature of 40–45° C. At the end of this period, 500 cc. of water were added to the reaction mixture, stirred in and the mixture then permitted to separate into two layers. The aqueous layer resulting was decanted and evaporated under reduced pressure to obtain 110 grams of water-soluble terpene hydroxylated ether. This product became terpid due to partial crystallization upon standing for six weeks.

The products in accordance with this invention are useful in the flotation of minerals and as coupling solvents for water-soluble and water-insoluble materials. The water-insoluble materials are excellent slowly evaporating solvents for cellulose derivative lacquers and for varnishes.

It will be understood that the details and examples hereinbefore set forth are illustrative only, and that the invention as broadly described and claimed is in no way limited thereby.

What I claim and desire to protect by Letters Patent is:

1. A method which comprises subjecting a mixture comprising a terpene and an alcohol to reaction with a gas containing free oxygen as the sole reactive ingredient until a hydroxylated terpene ether is produced and recovering the resulting product.

2. A method which comprises subjecting a mixture comprising a terpene hydrocarbon and an alcohol to reaction with oxygen in free gaseous form at temperatures in the range between about 0° C. and about 100° C. until a water-soluble terpene hydroxy ether is formed and recovering said water-soluble ether.

3. A method which comprises subjecting a mixture comprising a pyronene and an alcohol to reaction with a gas containing free oxygen as the sole reactive ingredient until a hydroxylated terpene ether is produced and recovering the resulting product.

4. A method which comprises subjecting a mixture comprising myrcene and an alcohol to reaction with a gas containing free oxygen as the sole reactive ingredient until a hydroxylated terpene ether is produced and recovering the resulting product.

5. A method which comprises subjecting a mixture comprising allo-ocimene and an alcohol to reaction with a gas containing free oxygen as the sole reactive ingredient until a hydroxylated terpene ether is produced and recovering the resulting product.

6. A method which comprises subjecting a mixture comprising a terpene, an alcohol, and an oxidation catalyst to reaction with a gas containing free oxygen as the sole reactive ingredient until a hydroxylated terpene ether is produced and recovering the resulting product.

7. A method which comprises subjecting a mixture comprising a terpene, an alcohol, and water to reaction with a gas containing free oxygen as the sole reactive ingredient until a hydroxylated terpene ether is produced and recovering the resulting product.

8. A method which comprises subjecting a mixture comprising a terpene hydrocarbon, an alcohol, and water to reaction with a gas containing free oxygen as the sole reactive ingredient at temperatures between about 0° C. and 100° C., until a water-soluble hydroxylated terpene ether is produced and recovering the said water-soluble compound.

9. A method which comprises subjecting a mixture comprising a terpene hydrocarbon and an alcohol to reaction with free oxygen under superatmospheric pressure in the presence of an oxidation catalyst until a hydroxylated terpene ether is produced and recovering the resulting product.

10. Water-soluble hydroxylated terpene ethers characterized by at least one tertiary terpene hydroxyl, by loss of hydroxyl on heating with sulfuric acid and by being capable of concentration to a syrup which upon standing deposits colorless crystals of terpene hydroxy ethers, said hydroxylated terpene ethers being obtained by the process according to claim 1.

11. Water-soluble hydroxylated terpene methyl ethers characterized by at least one tertiary terpene hydroxyl, by loss of hydroxyl on heating with sulfuric acid and by being capable of concentration to a syrup which upon standing deposits colorless crystals of terpene hydroxy ethers, said hydroxylated terpene ethers being obtained by the process according to claim 1 with methyl alcohol as the alcohol.

12. Water-soluble hydroxylated terpene ethyl ethers characterized by at least one tertiary terpene hydroxyl, by loss of hydroxyl on heating with sulfuric acid and by being capable of concentration to a syrup which upon standing deposits colorless crystals of terpene hydroxy ethers, said hydroxylated terpene ethers being obtained by the process according to claim 1 with ethyl alcohol as the alcohol.

13. Water-soluble hydroxylated terpene phenyl ethers characterized by at least one tertiary terpene hydroxyl, by loss of hydroxyl on heating with sulfuric acid and by being capable of concentration to a syrup which upon standing deposits colorless crystals of terpene hydroxy ethers, said hydroxylated terpene ethers being obtained by the process according to claim 1 with phenol as the alcohol.

JOSEPH N. BORGLIN.